Jan. 19, 1954 W. F. HUCH 2,666,601
CONSTANT ALTITUDE BALLOON
Filed Feb. 15, 1952 2 Sheets-Sheet 1

INVENTOR
WILLIAM F. HUCH

BY William C Strueber ATTORNEY

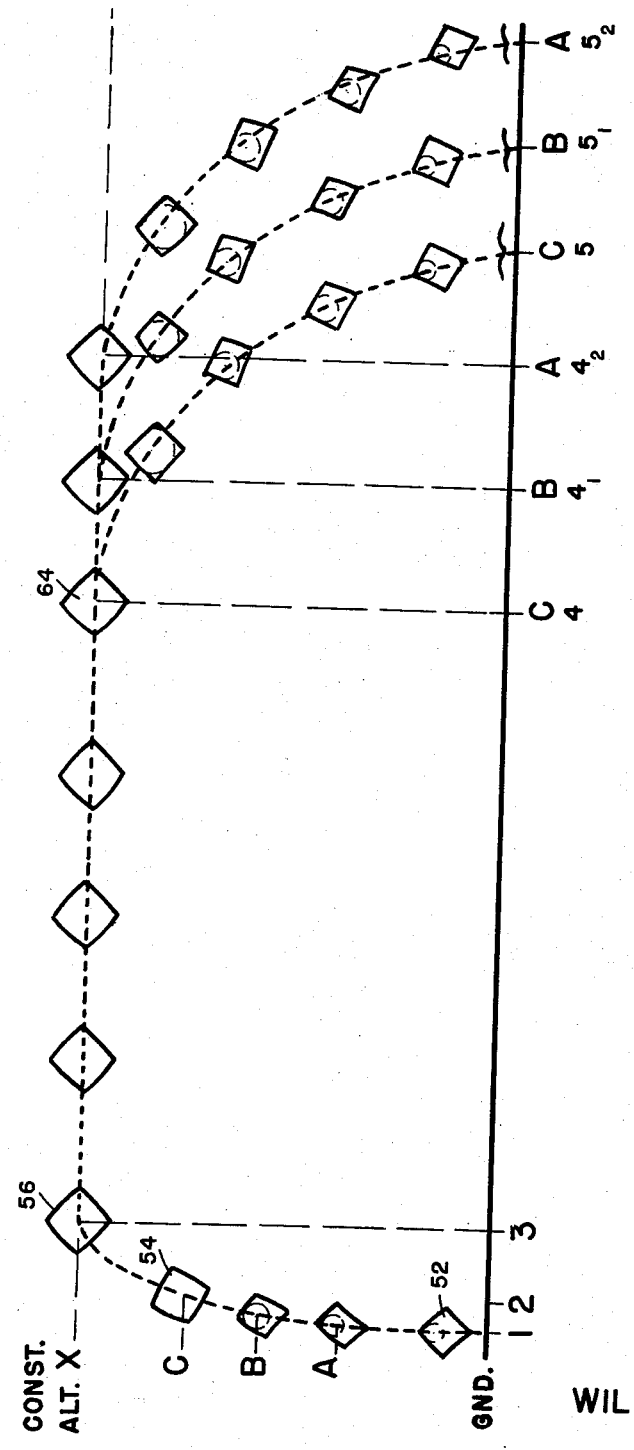

Patented Jan. 19, 1954

UNITED STATES PATENT OFFICE 2,666,601

CONSTANT ALTITUDE BALLOON

William F. Huch, St. Paul, Minn., assignor to General Mills, Inc., a corporation of Delaware Application February 15, 1952, Serial No. 271,718

8 Claims. (Cl. 244—31)

This invention relates to improvements in balloons and methods of inflating and flying balloons.

As balloons are sent aloft, they have movement with the air currents and are carried from their place of launching in the direction and at the speed of the winds. This fact can be utilized in using balloons as a means of transporting loads from one location to another. If the path of the balloon is to be known, then the altitudes at which the balloons fly and the time spent at these altitudes must be known because the air currents change in direction and velocity at various altitudes. Balloons heretofore used have attempted to control their altitude by the release of gas or the dropping of ballast. These methods are undesirable in that the gas released cannot be used to contribute to lifting the balloon and the ballast carried serves no other useful function but limits the performance of the balloon. In addition, in balloons which do not carry an operator such as in small balloons, some means must be provided to automatically control the release of gas and discharge of ballast. The present invention provides a small balloon which will eliminate the necessity of the provision of ballast and eliminate the provision of a valve to vent the lifting gas and provides a balloon which flies at essentially a constant altitude without specific altitude control apparatus.

An object of the invention is to provide a balloon capable of carrying a load, such as a message, and a method of inflating and flying the balloon to carry the message over a considerable distance, utilizing the prevailing winds.

A further object of the invention is to provide a balloon and method of inflating and flying which will enable accurately selecting the area in which the balloon will land.

Another object is to provide a balloon for carrying a message and method of flying the balloon so that the flying altitude of the balloon may be selected in order than an air current of desirable direction and speed may be chosen to carry the balloon toward a predetermined landing area.

Another object is to provide a balloon and method of inflating and flying same that will cause the balloon to reach a pre-selected altitude and remain at that altitude for a considerable period of time in order that its path of flight may be more accurately determined.

A further object of the invention is to provide a message carrying balloon and method of inflating and flying the balloon which enables the balloon to be flown at a constant altitude for a controllable length of time so that the time at which the balloon will leave the predetermined altitude for descent may be accurately controlled in order that its place of landing may be forecast.

Another object of the invention is to provide a balloon formed of non-extensible material and completely sealed against atmosphere, which will enable the gas within the balloon to expand to pressures greater than atmospheric without appreciably increasing the size of the balloon.

A still further object of the invention is to provide a quick and simple method of inflating a balloon which will enable very accurate control of the amount of lifting gas inflated into the balloon with the use of simple equipment.

Another object of the invention is to provide means for determining the time which a balloon will remain aloft at a constant altitude and thus determining the landing location by accurately weighing the amount of gas inflated into the balloon which is in excess of that amount which is necessary to fully inflate the balloon at maximum altitude.

Another object is to provide a sealed balloon of nonextensible material having a known gas diffusion and leakage rate in order that it may be predicted when sufficient gas will leave the balloon to cause it to diminish in size and begin its descent.

Other objects and advantages will become apparent from the following specification taken in connection with the attached drawings, in which:

Fig. 7 is a schematic view illustrating the path of travel of a balloon and its physical appearance at various locations in its path of travel.

Figure 1:
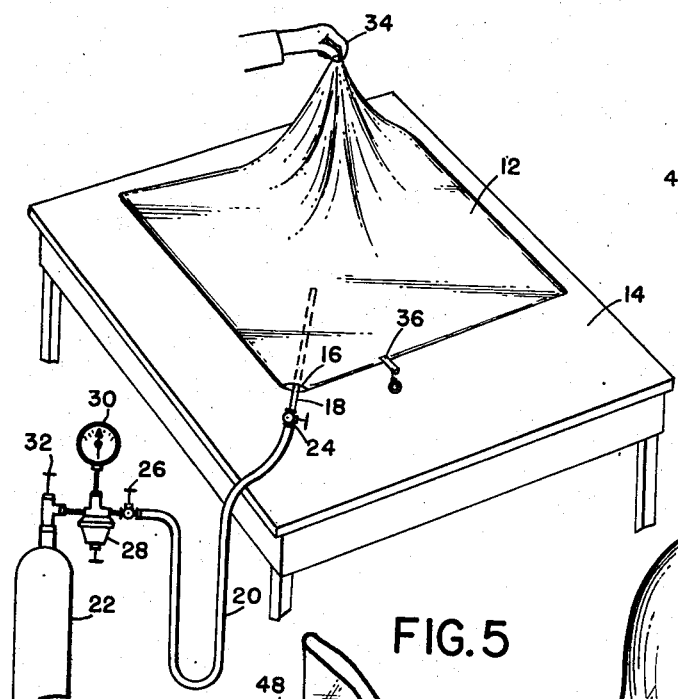
Figure 1 is a perspective of the balloon envelope and the apparatus for inflating the balloon with a lifting gas.
Figure 2:
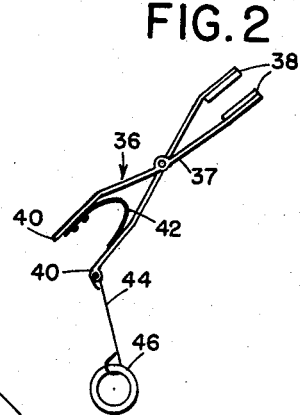
Fig. 2 is a perspective view of the clamping device for attaching a weight to the balloon.
Figure 3:
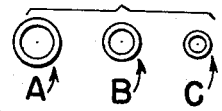
Fig. 3 illustrates weights which may be used in the method of inflation.

The present invention provides a balloon which is capable of being flown at a constant altitude. A balloon with this capability is useful in the science of meteorology in instances where it is desirable to study weather conditions at a fixed altitude. The balloon finds utility in other fields because of the ability to predict its course of travel. It is useful for propaganda purposes, as such a balloon can be sent aloft carrying propaganda messages with the knowlege that it will land in a certain area and be received by whoever is in that area.

In addition to its ability to be flown at a constant altitude, the balloon embodying the principles of the present invention can be formed of relatively inexpensive material and be rapidly manufactured in large numbers. Such an inexpensive dispensible balloon may be used for only a single flight and large numbers can be flown to achieve mass effects in propaganda distribution. Since the prevailing winds in the temperate zones travel from west to east, balloons which can be flown at a constant altitude can be sent aloft and their place of landing accurately predetermined. It may readily be seen that these balloons are usable to send propaganda from one country across the border and into the interior of any other country which lies to the east of it. The propaganda may be in the form of light weight messages placed within the balloon or the propaganda may be printed on the surface of the balloon itself.

As the balloon is sent aloft with a lifting gas inside, it is buoyed up, according to Archimedes law, by a force equal to the weight of air displaced by the balloon. Therefore, the maximum attainable altitude of a balloon is determined by its maximum volume and by the weight of the balloon material and the gas inside and the load carried. If the balloon is filled on the ground with only sufficient gas to inflate it to its full size when it reaches maximum altitude, it will ascend to that maximum altitude and immediately begin descending because of the fact that the lifting gas will diffuse through the walls of the balloon material.

In practicing the present invention, the balloons are made of a light weight material which is non-extensible so that, if the gas within increases in pressure until it becomes greater than atmospheric pressure, the balloon will not increase in volume. The balloon is filled with an amount of gas in excess of that amount necessary to fully inflate the balloon so that it will take some period of time for this excess gas to leak and diffuse through the balloon walls. During this time that the excess gas is passing through the balloon walls, the balloon will remain fully inflated and continue at its constant altitude. While it is true that this excess gas adds additional weight to the balloon, in practical usage the difference is so small that it may be ignored.

The rate of diffusion and leakage of a lifting gas through a balloon of a certain material will be a known factor and thus the time required for a given amount of excess gas to leak and diffuse through the walls of the balloon can be accurately determined. When a balloon is sent aloft containing a certain amount of excess gas which is in addition to the gas necessary to fully inflate it at maximum altitude, it will stay at its constant altitude for the time required for the gas to leak and diffuse through the balloon wall. By taking into account the direction and velocity of the air currents at the constant altitude and the time at which the balloon will remain at that altitude, its location and time of landing can be fairly accurately forecast.

If the balloon, for example, is to be used for propaganda purposes, the location of the recipients will be known and the optimum time for them to receive the propaganda will also be known. By choosing the factors of the flying altitude of the balloon and the place and time of launching, propaganda messages carried by the balloon can be landed at the desired time and place.

Referring now to Figs. 1 through 5, the method and apparatus for inflating and launching the balloon will be described.

The balloon 12 is first observed as a collapsed rectangular balloon envelope. The material forming the envelope is a thin, lightweight non-extensible material, which may be a thermoplastic material, such as polyethylene. The envelope 12 is positioned on a platform or table 14, for inflation and has an inflation hole 16 formed in one corner, usually constructed by merely cutting the corner from the rectangular envelope. An inflation tube 18 is inserted through the inflation hole 16 into the balloon between its walls. To supply gas to the inflation tube, a hose 20 connects between it and a cylinder 22 of compressed lifting gas, such as helium. A control valve 24 is positioned between the hose 20 and the tube 18 and another control valve 26 is positioned between the hose and a pressure reducer 28 which is mounted on the gas cylinder 22. The pressure reducer has a valve 30 which indicates the reduced pressure of the gas. The cylinder 22 has the usual main control valve 32 at its top to shut off the flow of gas.

With the opening of the valves 32, 26 and 24, gas will flow into the balloon envelope. A corner of the balloon envelope opposite the inflation opening 16 is lifted off the table as by a hand 34 so that the first gas will flow upwardly into the end of the balloon and not escape through the inflation hole. It is desirable that the balloon material be pinched about the inflation tube 18 to prevent escape of gas and to keep air out of the balloon.

In the filling of balloon envelopes of a small size, such as are used in the present invention, the amount of gas filled therein is very critical and cannot be measured with sufficient accuracy with an ordinary flow valve. To measure the amount of gas inflated into the balloon, the balloon is "weighed" or "weighed-off" by attaching an object of a certain definite weight to the lower edge of the balloon. The amount of gas in the balloon is proportional to its lifting ability and therefore when the balloon is capable of lifting the attached object or weight, the volume of gas within the balloon is known. The weight must be attached to the lower edge of the balloon as it will hang downwardly and keep the inflation opening 16 lower than the pocket of gas which forms in the end of the balloon. The weight 36 is shown generally, as attached to the balloon envelope in Fig. 1 and is shown, in detail, in Fig. 2.

The device for attaching weight to the balloon edge is a clamp 37 having opposed padded jaws 38 which will not damage the balloon material. The clamp has handles 40 on the opposite end which, when pressed together, separate the jaws. A spring 42 biases the jaws together. At the end of one of the handles is a hook 44 adapted to receive a weight 46 in the form of a metal ring. The metal rings are shown in detail in Fig. 3 and are provided in different sizes, ranging from larger to smaller, as shown by the figures labeled A, B and C.

Figure 4:
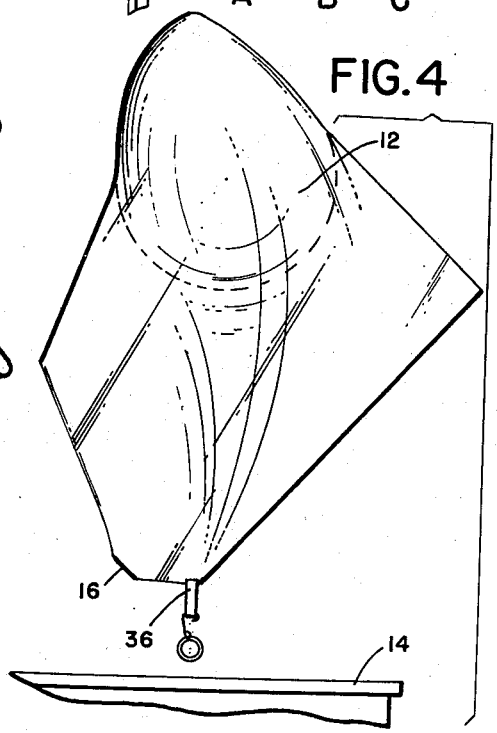
Fig. 4 is a front elevation illustrating the balloon as sufficiently inflated to support the gas measuring weight.
Figure 5:
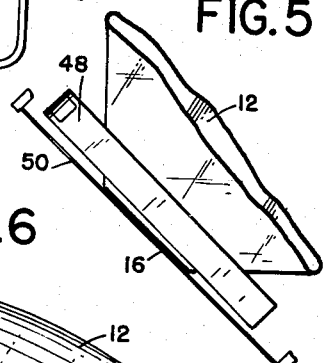
Fig. 5 is an enlarged elevation illustrating the sealing of the inflation opening of the balloon.

As shown in Fig. 4, when the balloon envelope 12 is filled with sufficient gas to support the total weight 36, the amount of gas therein is known and the inflation is stopped by turning off one of the valves, such as valve 24, and withdrawing the inflation tube 18 from the inflation opening 16. The opening is then sealed in an appropriate manner. If the material is thermoplastic, the opening may be sealed, as is illustrated in Fig. 5, by placing a clamp 48 across the material adjacent the opening and bringing a heated sealing wire 50 in contact with the edges of the opening. This causes the thermoplastic material to melt and fuse together to seal the balloon. Other methods, such as heated jaws, band-type closures, etc. may also be used.

Figure 6:
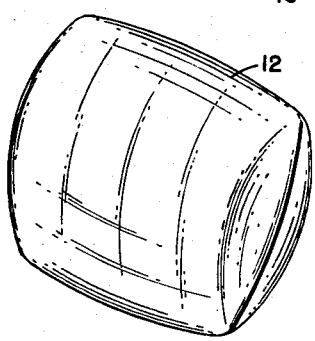
Fig. 6 is a perspective view of the balloon when fully inflated and as it appears at its constant flying altitude.

Referring to Fig. 7, the paths of flight of balloons filled with various amounts of gas are shown diagrammatically. The place of launching is at the position numbered 1 shown by the balloon numbered 52. As the balloon ascends, following the path indicated by the dotted line between the balloons, it passes to regions of lesser air pressure and consequently the gas expands to inflate the balloon. In the illustration shown the balloon has become fully expanded when it reaches the altitude indicated at C shown by the balloon numbered 54, and indicated at the ground location 2. The now fully expanded balloon continues its upward travel until it reaches its maximum altitude X. This maximum altitude is determined by the size of the balloon which, of course, determines its displacement volume. The balloon, when fully expanded or inflated, has the appearance shown in detail in Fig. 6.

At maximum altitude X, shown by the balloon numbered 56, the gas pressure within the balloon is greater than the atmospheric pressure, maintaining the balloon at its fully expanded size. The balloon remaining at this full size will remain at constant altitude X until the size decreases. This will not occur until the balloon begins to decrease in size, either because the gas is released or because the gas has diffused and leaked through the walls of the balloon. In either case, the point at which the balloon makes its descent is known and the landing area of the balloon can be predetermined.

The balloon, having been filled with the weight C attached to it, begins its descent at the location marked 4 in Fig. 7 and shown by the position of balloon 64. At that location the excess gas which has kept the balloon fully inflated has leaked and diffused through the balloon wall and the balloon becomes less than its maximum volume and consequently descends. The gas continues to diffuse through the balloon wall until the balloon reaches the ground at the location marked 5.

If, in the inflation of the balloon, the metal ring C is replaced by the heavier metal ring B, a greater amount of lifting gas will be required to raise the heavier ring from the table when the balloon is inflated, and consequently a greater amount of gas will be filled into the balloon. The same follows if the metal ring A is used, being the heaviest of the rings shown. With the ring A, a still greater amount of gas is required to lift the additional weight and the balloon will receive a greater charge of lifting gas.

The weight of the ring plus the weight of the clamp represents the amount of gas which is in excess of that needed to fully inflate the balloon at its maximum altitude. If no weight were attached to the balloon at its inflation and it were inflated to the point where it would be in equilibrium so that the gas pocket in the balloon lifted the weight of the balloon material, this would be just enough gas to fully inflate the balloon at its maximum altitude. With this much gas, however, there would be no additional gas to allow for diffusion and leakage while the balloon was at maximum altitude and if the balloon were taken to maximum altitude it would be fully inflated but would begin immediately to descend as any diffusion and leakage of the gas would cause a reduction in the size or volume of the balloon.

Theoretically, if the balloon were filled with only enough gas to fully inflate it at maximum altitude the balloon would have no lift on the ground but would be in equilibrium with the gravitational force acting on it. In actual practice, in order to fill the balloon with only enough gas to have it fully inflated at maximum altitude, extra gas must be used to compensate for the gas which will leak and diffuse through the balloon wall while the balloon is ascending. This extra gas will give the balloon lift to carry it to its maximum altitude.

Any additional gas added to the balloon over the basic amount needed to fully inflate it at maximum altitude will then cause the balloon to remain at maximum altitude for the time needed for this additional gas to pass through the balloon walls. Since the time at which the balloon will stay at maximum altitude is directly proportional to this extra volume of gas and this extra volume of gas is equal in weight to the weight of the ring and clamp attached, the weight of the rings can be directly calibrated in units of time that the balloon will stay at maximum altitude.

When the weight A is used, the balloon will become fully inflated at the altitude indicated as A in Fig. 7 and, when the weight B is used, the balloon will become fully inflated at altitude B. Actually, the altitudes A, B and C, at which the balloon becomes fully inflated with different fillings of gas, are not as relatively far apart as Fig. 7 shows them and all distances and sizes in Fig. 7 are schematic and not drawn to proportion. If the weight B is used, the excess gas which is equal to the weight of the clamp and the ring B diffuses through the walls of the balloon while the balloon passes from location 3 to location $4_1$. If the weight A is used, the excess weight of gas completely diffuses while the balloon is carried from location 3 to location $4_2$. As a practical matter as above mentioned, provision must be made for the gas which diffuses through the walls of the balloon while it ascends from the ground to constant altitude or while it moves from location 1 to location 3. This can readily be done by adding enough weight to the clamp or rings to equal the amount of gas which will diffuse through the balloon wall over this period of time. Since this gas which leaks out on ascent must always be provided for, the specification and claims are generally intended to include this amount when they speak of the amount of gas required to fully inflate the balloon at maximum altitude. In other words the gas which is required to inflate the balloon at maximum altitude includes the gas required to replace that lost while getting to maximum altitude. Excess, additional or extra gas is generally referred to as the gas which leaks or diffuses from the balloon after it has reached maximum altitude.

Thus it will be seen that the location of landing of the balloon can be accurately determined for a given wind velocity at the altitude of flight of the balloon by determining the length of time which the balloon will stay at that altitude. This is controlled by weighing the amount of gas placed in the balloon, the gas equaling the amount needed to inflate the balloon at a certain altitude, plus the excess amount which will diffuse and leak through the balloon walls during the required time.

It should be noted that the words "diffuse" and "leak" are used to signify the passage of gas through the balloon walls. The word "diffuse" is used, strictly speaking, to indicate the passage of gas by absorption into the material and the re-evaporization on the outer surface. The word "leakage" indicates the passage of gas through the pores and holes which occur in the balloon material. The words are herein used interchangeably at times to indicate the general action of passage of gas through the balloon wall. Actually, the combination of these two actions, diffusion and leakage, totals the passage of gas through the material. The relative amounts of gas passing by each action is not important and the significant amount is the total passage of gas from the interior to the exterior of the balloon, which is readily determinable when the type of material to be used is known.

Thus it will be seen that a method of flying balloons has been provided which enables the accurate determination of the location of landing. This has been accomplished by providing a non-extensible completely sealed balloon envelope filled with a certain critical amount of gas. A method has been provided of measuring this critical amount of gas, which is simple and practical for the inflation of small balloons, by weighing the amount of gas in excess of that required to completely inflate the balloon at its maximum altitude.

Since there is a definite relationship between this excess amount of gas and the time during which the balloon will remain at constant altitude, the weights can be directly calibrated in the time which the balloon will remain at constant altitude or in distances of flight of the balloon.

It is to be understood that the shape of the balloon used is not limited to the shape shown in the preferred embodiment but the balloon may be of various configurations, such as spheres.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A constant altitude balloon comprising a sealed balloon envelope formed of a non-extensible material containing a volume of lifting gas sufficient to fully inflate the balloon at its maximum attainable altitude, and containing an additional volume of lifting gas to replace the gas which diffuses through the balloon walls to maintain the balloon constantly at said maximum altitude for an extended period of time.

2. A constant altitude balloon comprising a completely closed balloon envelope of non-extensible balloon material, an amount of lifting gas within the closed envelope equal in volume at the atmospheric pressure of maximum balloon altitude to the total volume of the expanded balloon envelope, and an additional amount of lifting gas equal in volume to the amount which will diffuse through the balloon envelope during the time the balloon is ascending to maximum altitude and during a predetermined time which the balloon is to remain at said maximum altitude.

3. A constant altitude balloon comprising a balloon envelope formed of non-extensible material sealed to atmosphere and filled with a greater amount of lifting gas than is necessary to fully inflate the balloon envelope at the maximum altitude attainable by the balloon.

4. The method of flying a balloon which comprises filling a balloon envelope of non-extensible material with an amount of lifting gas to inflate the envelope fully at maximum altitude, filling said envelope with an additional amount of lifting gas to keep the balloon fully inflated at maximum altitude for a period of time although gas passes through the balloon walls, and completely sealing the gas within the envelope.

5. The method of flying a balloon which comprises inflating a non-extensible balloon envelope at ground level with an amount of lifting gas which will fully inflate the balloon at its maximum attainable altitude, adding an additional amount of gas less than the amount necessary to completely fill the balloon, and sealing the balloon envelope and releasing it.

6. The method of flying a balloon formed of a non-extensible material which comprises partially inflating the balloon envelope through a filling opening with an amount of lifting gas equal to the sum of the amounts required to fully inflate the balloon at maximum altitude and to replace the gas which diffuses through the balloon wall during the time the balloon is to remain at said maximum altitude, and sealing the balloon filling opening to prevent escape of the gas and releasing the balloon.

7. The method of flying a balloon comprising filling a balloon of non-extensible material with an amount of lifting gas equal in weight to the difference in the weight of the volume of air displaced at the maximum altitude attainable with the balloon and the weight of balloon material and its load, filling the balloon with an additional amount of lifting gas equal to the amount which will be lost while the balloon is ascending to maximum altitude and while the balloon is floating at maximum altitude, and sealing the gas filled balloon and releasing it.

8. The method of inflating and sending a balloon aloft to land at a predetermined location which comprises, selecting a balloon of a size which when fully inflated will fly at an altitude at which the speed and direction of air currents are suitable to carry the balloon from the launching location to the landing location, inflating the balloon with sufficient lifting gas to fully inflate the balloon at said altitude and with an additional amount of gas which equals the amount of gas which will diffuse and leak through the balloon walls between launching time and the time when the balloon is to leave said altitude, said additional gas being sufficient to keep the balloon at said altitude for the desired time, sealing the balloon, and sending it aloft.

WILLIAM F. HUCH.

References Cited in the file of this patent

UNITED STATES PATENTS

| Number | Name | Date |
| --- | --- | --- |
| 1,035,560 | Erdmann | Aug. 13, 1912 |
| 1,329,584 | Marinis | Feb. 3, 1920 |
| 2,409,166 | Tracy | Oct. 8, 1946 |

FOREIGN PATENTS

| Number | Country | Date |
| --- | --- | --- |
| 223,675 | Germany | June 30, 1910 |

OTHER REFERENCES

Publication: "Instructions for Making Aerological Observations," Circular P., pages 78 and 79. This circular was published in 1930 by the Department of Agriculture.